Oct. 8, 1935.  J. W. WYLLIE  2,016,308
AUTOMATIC STOPPING DEVICE
Filed Nov. 13, 1929  4 Sheets-Sheet 3
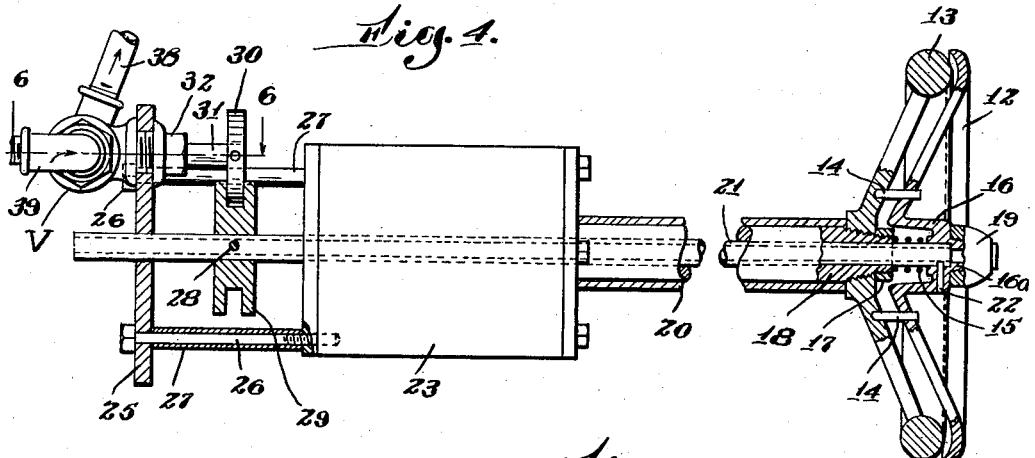
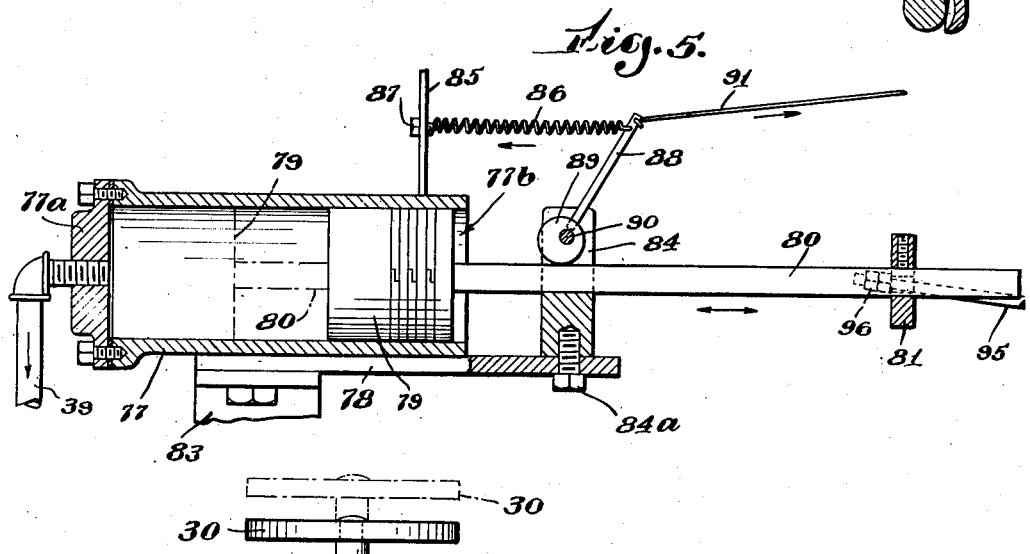
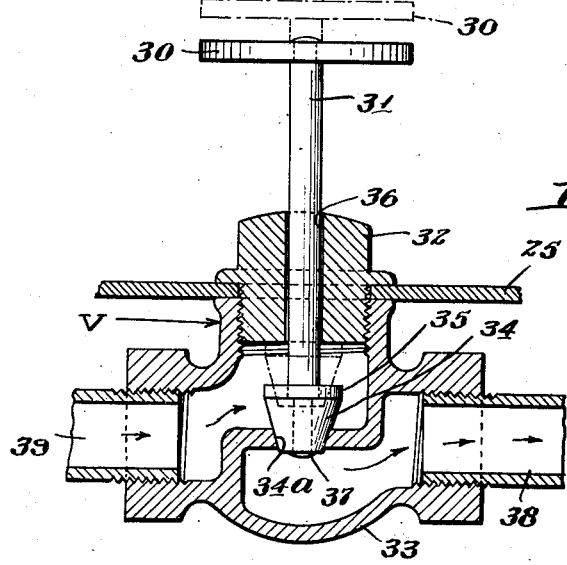
Inventor
John W. Wyllie
by Harold E. Cole
Attorney

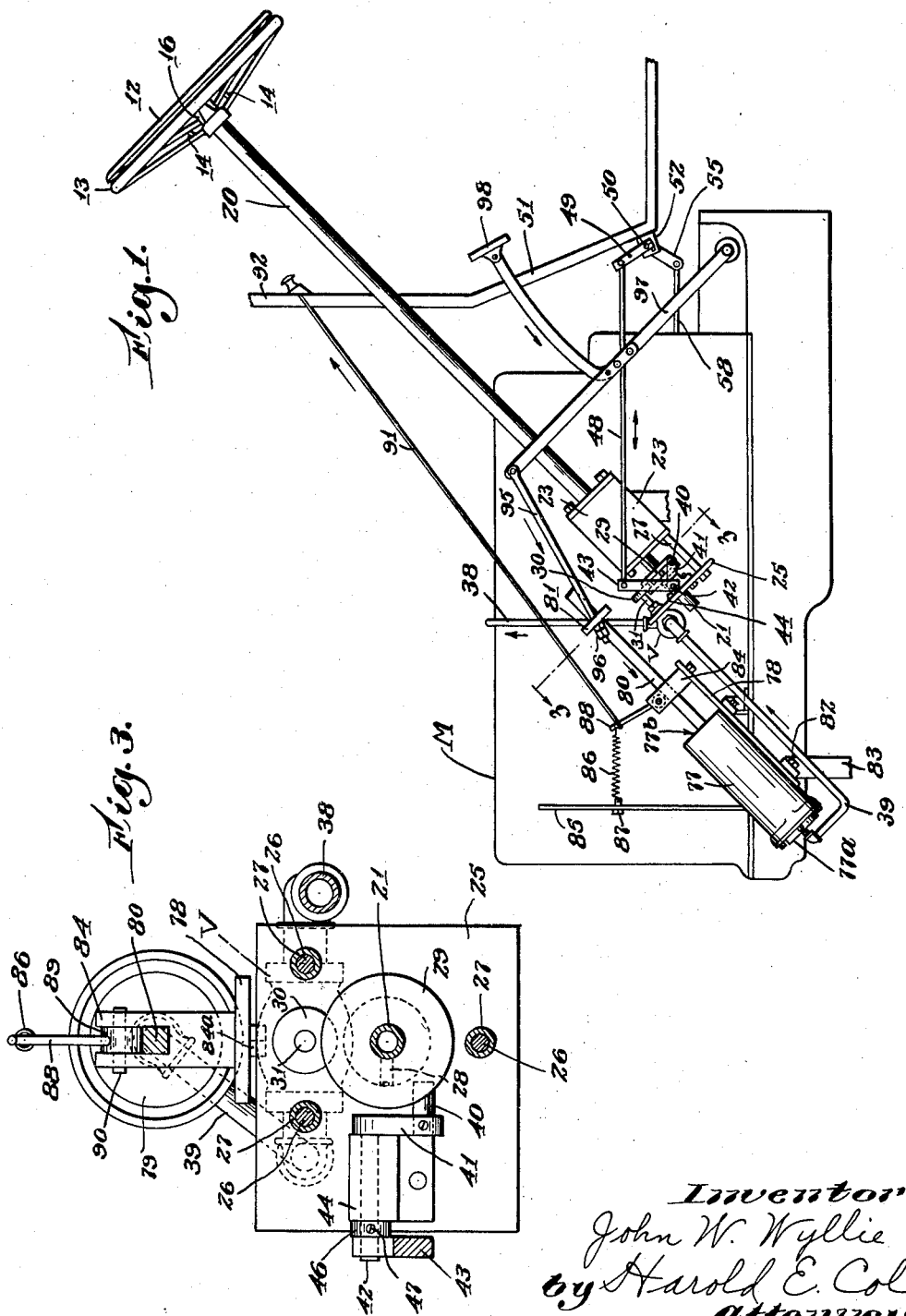

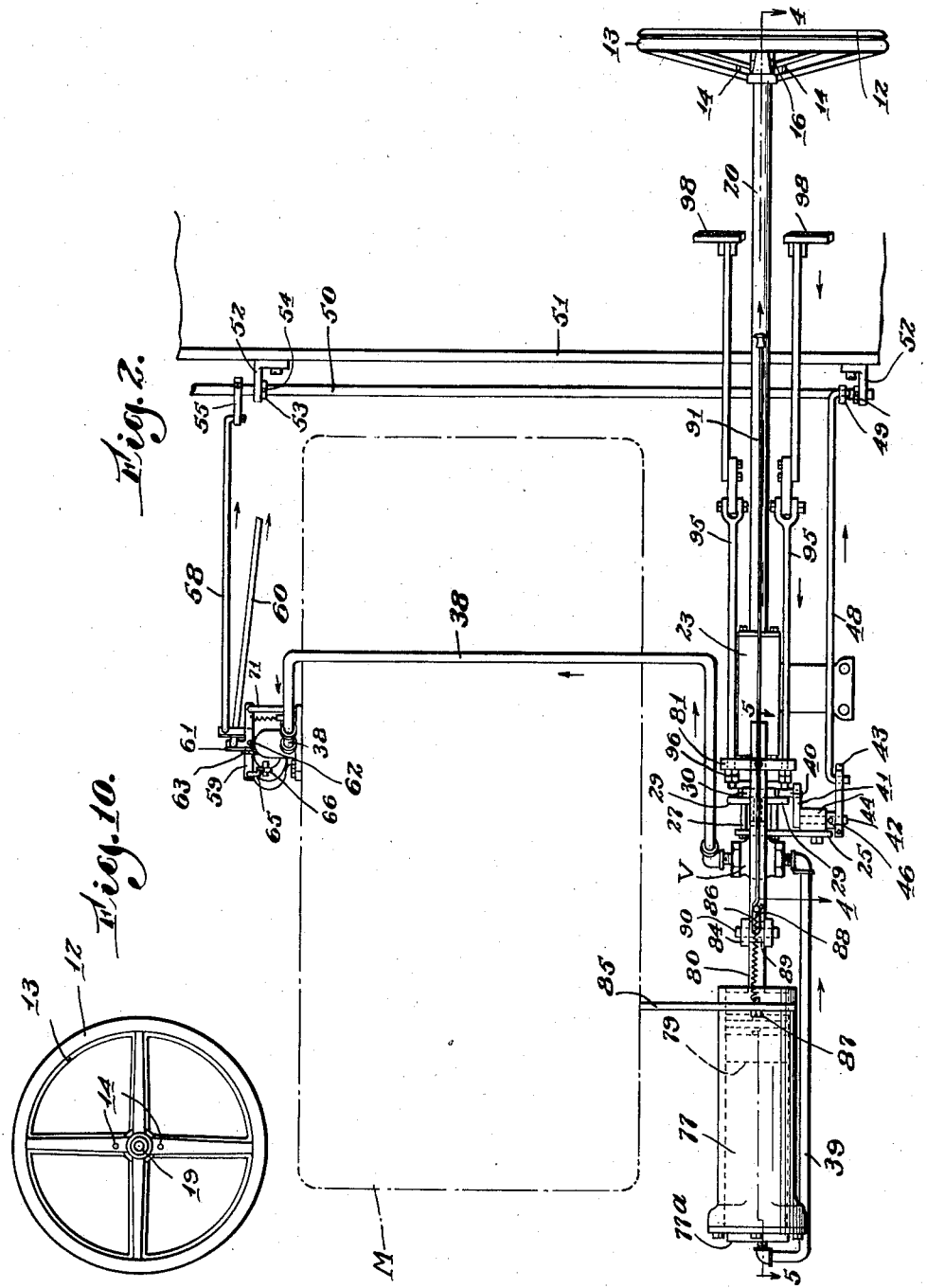

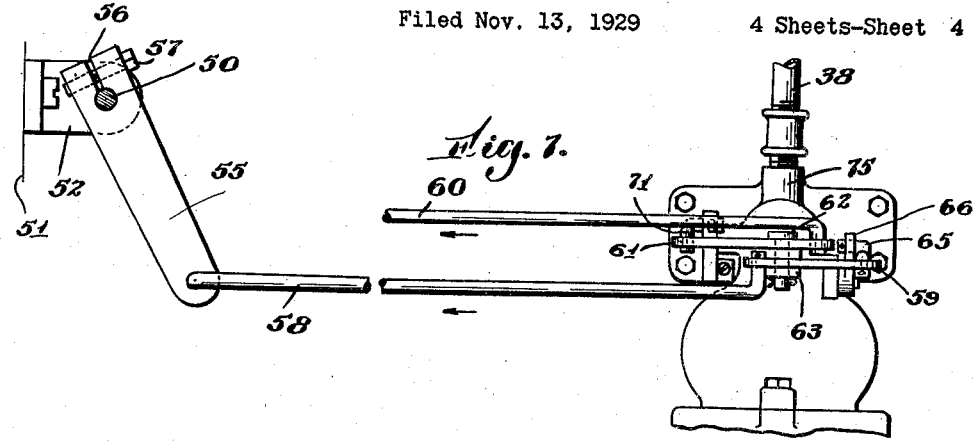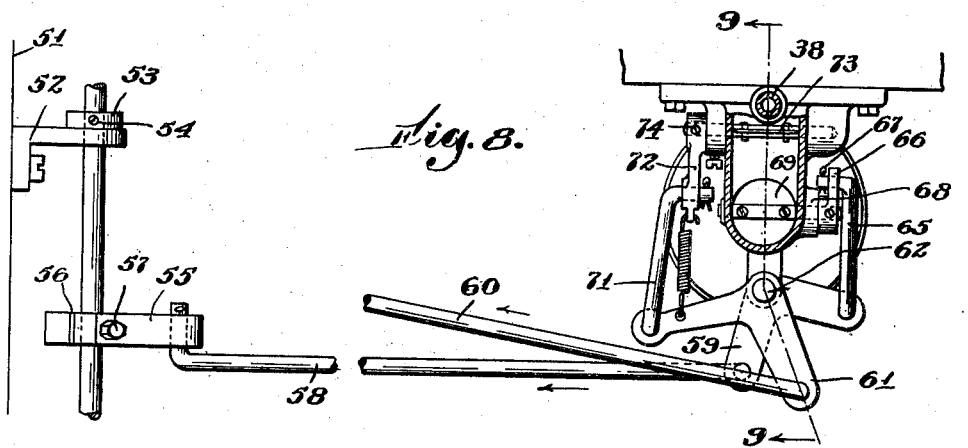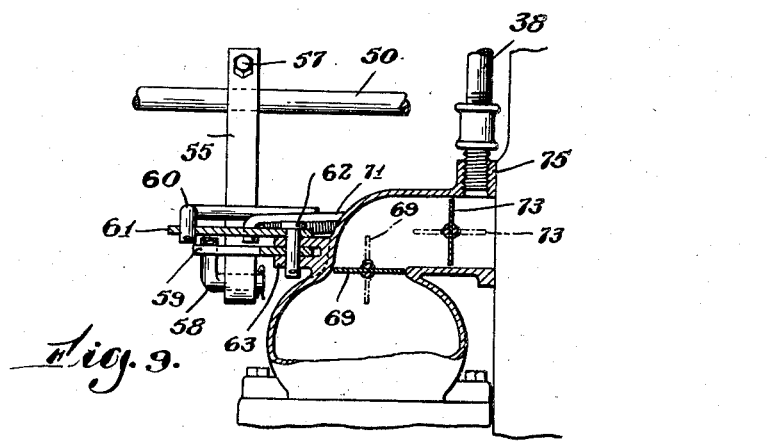

Patented Oct. 8, 1935

2,016,308

UNITED STATES PATENT OFFICE 2,016,308

AUTOMATIC STOPPING DEVICE

John W. Wyllie, Franklin, Mass.

Application November 13, 1929, Serial No. 406,790

18 Claims. (Cl. 188—110)

This invention relates to an automatic stopping device, more especially for use on automotive vehicles such as pleasure automobiles, trucks and buses.

Many accidents have occurred because of the collapse or temporary disability of the driver of a moving vehicle, with disastrous and sometimes fatal results to the occupants. When a driver loses control of his vehicle as a result of sickness, excitement or pain, et cetera, he almost invariably releases or loosens his hold on the steering wheel, with the result that the vehicle continues in driverless fashion until it is stopped, usually by colliding with something or tipping over. One of my objects has been to provide an automatic device which will bring the vehicle to a stop under such conditions.

I have found that the source of control for my automatic stopping device should preferably be located on or near the steering wheel and be directly responsive to the action of the driver in gripping or releasing his hold on said steering wheel. Then should the driver become incapacitated and his hand slip off the steering wheel, or his grip become loosened, my stopping device serves to automatically apply the brakes. The device is so assembled and operated, however, that it does not interfere with the normal operation of the vehicle, or in the customary way of bringing the vehicle to a stop.

In accordance with the rules of practice reference is made to my co-pending application, Serial No. 363,967, filing date May 17, 1929. The present invention, however, is designed to be set in operation by a vacuum when the driver's hold on the control wheel is loosened or released, which vacuum serves to operate mechanism that immediately applies the brakes.

For pleasure vehicles it has been found preferable to have a vacuum operated device rather than carry a supply of compressed air. No extra expense is incurred as the engine makes a vacuum under certain conditions which fully serves my purpose. Accordingly it has been my object to provide automatic mechanism which may be attached to an ordinary automobile for instance, which will automatically apply the brakes when the driver releases his hold on the steering wheel by making use of the vacuum created by the engine under certain conditions as when the engine is idling.

My device is not limited in its use to the above-mentioned purposes, as in addition to its safety features it makes the application of the brakes much easier than when using the feet. It is especially serviceable to cripples who have not the strength in their feet to apply the brakes, in fact, it will make automobiling much safer for persons who are handicapped by deformities, lack of strength, etc. because it enables them to quickly bring the vehicle to a stop. Also it is particularly well adapted for use on automobiles with which driving lessons are given, as should the beginner forget to apply the brake pedal the mere release of the steering wheel will bring the vehicle to a stop.

With the above and other objects in view which will more readily appear as the nature of the invention is better understood, the same consists in the novel construction, combination and arrangement of parts hereinafter more fully described, claimed and illustrated in the accompanying drawings, in which:

Figure 1 is a side elevation of my automatic stopping device mounted on an automobile.

Figure 2 is a plan view of the whole assembly.

Figure 3 is a section on the line 3—3 of Figure 1 showing the control valve and vacuum operated cylinder.

Figure 4 is an enlarged section on the line 4—4 of Figure 2 showing control wheel in cross section and control valve in elevation.

Figure 5 is a section on line 5—5 of Figure 2 showing the vacuum operated cylinder and piston and the automatic lock for same.

Figure 6 is a section on the line 6—6 of Figure 4 showing the control valve in its closed position with dotted lines representing its open position.

Figure 7 is a left side elevation of the automatic idler connected to an automobile carburetor.

Figure 8 is a plan view of the automatic idler and automobile carburetor with portion of the carburetor broken away to show inside mechanism and its connection with automatic idler.

Figure 9 is a section on line 9—9 of Figure 8 showing butterfly valves in carburetor in open and closed positions.

Figure 10 is a plan view showing the hand steering wheel and control wheel.

Like numerals and letters of reference indicate corresponding parts in each figure.

As illustrated my automatic stopping device consists of a control wheel 12, the gripping or releasing of which actuates the whole assembly. Said control wheel 12 is just above the regular steering wheel 13 of an automobile, although it may be placed just under the steering wheel 13 if desired. The two wheels 12 and 13 must be close enough together for the operator's hand to grasp and hold both at the same time. Two locating dowels 14 (Fig. 4) are fixed in the steering wheel 13 and are slidably mounted in the spider of said control wheel 12, permitting an up-and-down movement, but preventing any turning of said control wheel independent of said steering wheel. A compression spring 15 presses against the inner portion of the control wheel cap 16 and rests at its other end on a nut 17 fixed to the regular automobile steering post 18, which nut 17 serves to clamp the steering wheel 13 to said steering post 18. The spring 15 serves to keep the control wheel 12 away from the steering wheel 13. On top of the control wheel cap 16 is the horn button cap 19 which is threaded to the shouldered portion 16a of the wheel cap 16. The steering post outside casing has the numeral 20. Inside the steering post 18 is a hollow control tube 21 which is fixed to the wheel cap 16 by means of a pin 22. Said hollow tube 21 extends through the steering housing 23 to connect with the control valve later referred to.

A control valve supporting plate 25 is fastened to said steering housing 23 by means of bolts 26 as shown. Spacers 27 surround said bolts 26 to limit the shortest distance between said supporting plate 25 and said housing 23. Fastened to the control tube 21 by a set screw 28 is a bifurcated roll 29. The handle 30 of the automatic control valve V fits into the groove in said bifurcated roll. It will be seen that as the control wheel 12 moves upwardly when the driver's grip is released the control tube 21 moves the bifurcated roll 29 and the valve handle 30 upwardly at the same time thereby opening the control valve V. This valve V consists of a slidable stem 31, a nut 32 which screws into the body 33 of the valve, a tapered seating member 34 which is preferably made of fiber and has a soft rubber washer 35 at the top. There is a slight clearance 36 between the valve stem 31 and the nut 32 which serves as a vent when the valve is closed. When it is open, however, the washer 35 presses against the under side of said nut 32 thereby sealing said vent 36. As the bifurcated roll 29 is pushed downwardly the valve closes due to the seating member fitting tightly into the seat 34a shown in Figure 6 formed in the body 33 of the valve. Said valve stem 31 is smaller at its lower portion to form a shoulder and is headed over as at 37. A hollow tube 38 screws into the body 33 of said valve and extends to the motor of the vehicle and another hollow tube 39 runs to the vacuum cylinder later described. The arrows in Figures 2, 4, 6 and 10 show the direction of the vacuum.

My device is equipped with an automatic idler which is described as follows:

Fitting into one portion of the groove in the bifurcated roll 29 is a crank pin 40 which is attached to a crank 41, at the other end of which crank is a crank shaft 42 to which is fastened a link 43. Said crank shaft 42 is mounted in a block 44 which serves as a bearing for it, said block 44 being fastened to the supporting plate 25. This crank shaft 42 is provided with a collar 46 fixed to it by a screw 47, and serves to prevent any endwise movement. Said link 43 is pivotally connected to one end of a connecting rod 48 the other end of which rod pivotally connects with another link 49 which link is fixed to a long shaft 50 which shaft is fastened to the floor board 51 of the automobile by means of bearings 52 at each end. A collar 53 is fixed to said shaft 50 at the end of each bearing 52 and held in place by a set screw 54. It will be seen that the upward movement of said bifurcated roll 29 lifts the crank pin 40 and turns said crank shaft 42. At the other end of the long shaft 50 is a link 55 through which said shaft 50 passes. Said link 55 has a slot 56 made in one end and a screw 57 passes through said slot 56 as shown in Figure 7, the tightening of which securely fastens said shaft 50 to said link 55. A connecting rod 58 extends from link 55 to a bell crank 59 for the automatic idler. The other rod 60 shown broken away is the one commonly used to connect at one end with the accelerator (not shown) of the automobile, and connects at the other end with another bell crank 61 which is part of the regular motor carburetor construction. Both of these bell cranks 59 and 61 have the same pivot 62, and rest on a split lug 63 attached to the carburetor, the idler bell crank 59 fits into said split and the regular bell crank 61 rests on top of said lug 63, the pivot 62 passing through holes made in said bell cranks and lug. A short idler rod 65 is attached at one end to said bell crank 59 and its other end is bent over and passes through a hole in the lug 66 and held in place by a cotter pin 67. This lug 66 is affixed to the idler butterfly shaft 68 on which is mounted the idler butterfly valve 69. This idler butterfly valve 69 has but two positions, that is, open or closed. When it is closed it practically shuts off the flow of gasoline-air vapor from the carburetor and the open and closed positions of said valve 69 are illustrated in Figure 9. It will be seen that so long as the idler butterfly valve 69 is closed it makes no difference whether or not the regular butterfly valve 73, later referred to, is open or closed. In normal driving position with the operator holding the control wheel 12 down the idler butterfly valve 69 is wide open and does not have any effect on the operation of the car, the operator feeding the carburetor by the hand throttle or accelerator connected to the rod 60 just as if said idler mechanism were not attached. Another short rod 71 is attached at one end to said bell crank 61 and at the other end to a lug 72 which lug is affixed to the regular carburetor butterfly valve 73 by means of a set screw 74, which assembly normally regulates the flow of gasoline-air vapor to the motor in the usual manner. The rest of the carburetor and motor M being of standard construction it is not shown. When either of the rods 58 and 60 are moved in the direction of the arrows shown in Figure 8 the butterfly valves are opened. Of course the regular carburetor butterfly valve 73 may assume any intermediate position between open and closed positions in accordance with the operator's movement of the accelerator. It will be seen that the turning of the crank shaft 42 moves the connecting rod 48 which turns the long shaft 50 thereby actuating the connecting rod 58 connected to the idler bell crank 59 thereby opening or closing the idler butterfly valve 69 according to the direction of the movement. When the driver's grip on the control wheel is loosened, either purposely or accidentally the spring 15 forces the wheel 12 upwardly which actuates the automatic idler mechanism to close the idler butterfly valve 69 thereby cutting off the flow of gasoline-air vapor from the carburetor, which idles the motor. The vacuum created by the suction of the idled motor under these conditions serves to move the piston in the cylinder later described, for the control valve is opened by said movement of the wheel 12 as previously explained.

At the upper portion of the carburetor is a boss 75 internally screw threaded into which is screwed the hollow tube 38 thereby connecting the motor of the automobile with one end of the control valve V while the hollow tube 39 connects the other end of said valve V with the cylinder 77 by screwing into the cylinder end cap 77a which is gasketed. The other end of said cylinder is open as at 77b. Said cylinder 77 is fastened to the motor or other part of the vehicle by the plate 78.

A piston 79 is slidably mounted in said cylinder 77, having a piston rod 80 which is fastened at its outside end to a yoke 81, later referred to. The plate 78 is bolted to the cylinder 77 as at 82 by brackets 83 to which plate 78 a forked member 84 is fixed by a screw 84a. The piston rod 80 passes through an opening in said forked member 84 and is slidable therein except when locked as later described. Fastened to an extension plate 85 which is attached to the automobile is a close wound spring 86 held to said plate 85 by a bolt 87 and fastened at its other end to a cam rod 88 one end of which screws into a cam 89. Said cam 89 is inserted in the forked member 84 in contact with the piston rod 80, and is revoluble on a stub shaft 90 which is movably fitted into an eccentric hole in said cam 89. A wire or cord 91 extends from the cam rod 88 to the dash board 92 (Fig. 1) or to any other part of the vehicle where it may easily be reached by the driver. The normal driving position of the piston 79 is that shown in Figure 5. When the motor is idled, however, a vacuum is created in the lower part of the cylinder 77 by the motor due to the direct connection established between said motor and cylinder by the tubes 38 and 39 and the opening of the control valve V. The piston 79, as a result of the partial vacuum created, moves downwardly in said cylinder 77 to the lower part of the cylinder to the position shown in the dotted lines in Figure 5 thus pulling the clutch and brake pedals of the vehicle down with it. The piston 79 is free to move downwardly in said cylinder as the cam 89 permits such downward movement of the piston rod 80, as the force applied to the piston 79 under such conditions easily overcomes the tension or opposing force of the spring 86. Said piston cannot move upwardly, however, as the spring 86 tends to pull said cam rod 88 in the direction of the arrow shown in Figure 5 so that any attempted upward movement of the piston rod 80 rotates the cam 89 to a higher position thereby binding the piston rod against the surface of the cam, preventing return of the piston to its normal or driving position, thus providing an automatic emergency or parking brake to thereby keep the brakes applied indefinitely. The brakes may be unlocked from this position only by pulling the wire 91 in direction of arrow shown in Figure 5 which rotates said cam 89 to a lower position thereby permitting the piston to return to the position shown in Figure 5. Not only does my device automatically bring the vehicle to a stop in an emergency, but it also provides at the same time an automatic safety brake so that the car cannot move forward again, as it otherwise would if an accident occurred while on a down grade.

At each end of the yoke 81 oversize holes are provided in each of which a rod 95 is free to slide, which rods are kept in said holes by the nuts 96. These sliding rods 95 permit the application of the clutch and brake independently of my device in the normal operation of the vehicle. Said rods 95 are connected to the regular clutch and brake rods 97 to which the foot pedals 98 are fixed. Inasmuch as the clutch and brake mechanism are of the standard construction no further illustration or explanation is required.

I have shown my device applied to a certain make of automobile; but inasmuch as the different makes vary somewhat in construction certain changes would be obviously necessary in attaching and connecting my device, which a mechanic could readily make.

While I have previously explained the operation of the various parts I shall briefly explain the operation and coordination of the whole assembly as follows:

When the vehicle is being operated the driver's grip on the control wheel 12 holds it down so that the bifurcated roll 29 is kept in its lower position thereby keeping the control valve V closed and the automatic idler mechanism inoperative. The vehicle is operated in the usual manner and my device does not affect such operation in any way. Immediately upon the driver releasing his grip on the control wheel 12, however, my device is automatically actuated almost instantaneously, for the upward movement of the control wheel 12 pulls the control tube 21 upwardly, carrying with it the bifurcated roll 29. As this roll 29 is operatively connected to the control valve V and the automatic idler as previously explained, said upward movement opens said valve V and also closes the idler butterfly valve 69 thereby automatically shutting off the flow of air-gasoline vapor from the carburetor. Even if the driver keeps his foot on the accelerator, or the hand throttle is left in such position as to keep the regular carburetor butterfly valve 73 wide open, the motor is idled just the same, as the closing of the butterfly valve 69 shuts off the carburetor. This idling of the motor creates a vacuum in the well known manner and the valve V being open, the tubes 38 and 39 directly connect the cylinder 77 with the motor so that the suction from the motor draws the air from the lower portion of said cylinder making a vacuum and the piston 79 is immediately and naturally forced down into said vacuum space by the pressure of air on the piston 79 at the open end 77b of the cylinder. Said piston rod being connected by the piston rod 80 to the clutch and brake pedals the downward movement of said piston pulls the clutch and brake pedals downwardly and the clutch is thrown out and the brakes applied just as if the driver had pressed his feet against said pedals. When the driver is ready to proceed again a pull on the wire 91 permits the brake and clutch mechanism to return to normal.

While a specific embodiment of the invention has been illustrated and described, the invention is not to be considered as limited to the particular combination and arrangement of parts as above described except as limited in scope by the appended claims.

I claim as my invention:

1. An automatic retarding device for a motor vehicle comprising a movable control wheel, a control rod connected to said wheel, a control valve connected to said rod, idler mechanism connected to said rod and to the vehicle motor, cylinder and piston means, tube means connected to said control valve and to said motor and to said cylinder, said piston being connected to the braking mechanism of said vehicle, said control wheel being adapted to actuate said control rod, said control rod being adapted to actuate said control valve an said idler mechanism whereby said motor creates a partial vacuum in said cylinder, said piston being adapted to be actuated by the creation of said partial vacuum to apply said braking mechanism.

2. An automatic retarding device for a motor vehicle comprising movable control means which is held inoperative by the driver when the vehicle is moving normally, but which is adapted to move when the driver no longer holds the said means inoperative, means operatively connected to said control means and adapted to be actuated thereby when the aforesaid control means moves, whereby a partial vacuum may be created by said vehicle motor, and means operatively connected to said motor and to the braking and clutch mechanisms of said vehicle adapted to be set in operation by the creation of said partial vacuum to thereby apply said braking mechanism and shift the clutch.

3. An automatic retarding device for a motor vehicle comprising control means to actuate said device, automatic auxiliary idler mechanism connected to the vehicle motor and adapted to be actuated by said control means, a control valve adapted to be actuated by said control means synchronously with the actuation of said idler mechanism, brake actuating means connected to the braking mechanism of said vehicle, connecting means connecting said motor to said control valve and said control valve to said brake actuating means, said brake actuating means being adapted to be set in operation by the creation of a partial vacuum by said motor when it is idled to thereby apply said braking mechanism.

4. An automatic stopping device for a motor vehicle comprising control means to actuate said device, automatic idler mechanism connected to the vehicle motor and adapted to be actuated by said control means, a control valve adapted to be actuated by said control means synchronously with the actuation of said idler mechanism, brake actuating means connected to the braking mechanism of said vehicle, connecting means connecting said motor to said control valve and said control valve to said brake actuating means, said brake actuating means being adapted to be set in operation by the creation of a partial vacuum by said motor when it is idled to thereby apply the braking mechanism to bring said vehicle to a stop, and locking means connected to said brake actuating means adapted to hold said brake actuating means in braking position indefinitely, and means to unlock said brake actuating means and permit return of said brake actuating means to original position.

5. An automatic stopping device for a motor vehicle comprising movable control means adapted to be held in one position by the driver in the normal operation of the vehicle, a control valve adapted to be opened and closed by said control means, auxiliary idler mechanism adapted to be actuated by said control means, when the said movable control means is no longer held in said one position by the driver, thereby to idle the motor, brake actuating means connected to the motor of the vehicle by way of said control valve adapted to be actuated by the creation of a partial vacuum when said motor is idled to thereby apply the braking mechanism of the vehicle.

6. An automatic retarding device for a motor vehicle comprising movable control means adjacent to the steering wheel of the vehicle, mechanism connected to and adapted to be actuated by said control means and also connected to said vehicle motor, instrumentalities connected to the braking members of said vehicle and to said motor, said mechanism when actuated by said control means being adapted to cause said motor to create a partial vacuum, and said instrumentalities being adapted to be actuated by the creation of said vacuum to thereby apply said braking members.

7. An automatic stopping device for a motor vehicle comprising movable control means adjacent to the steering wheel of the vehicle, mechanism connected to and adapted to be actuated by said control means and also connected to said vehicle motor, instrumentalities connected to the braking members of said vehicle and to said motor, said mechanism when actuated by said control means being adapted to cause said motor to create a partial vacuum, and said instrumentalities being adapted to be actuated by the creation of said partial vacuum to thereby apply said braking members, and locking means adapted to lock said instrumentalities in braking position to thereby keep said braking members applied.

8. An automatic stopping device for a motor vehicle comprising a movable control wheel, a control rod connected to and adapted to be actuated by said control wheel, a valve, crank means, a member adapted to be actuated by said control rod and connected to said valve and crank means and adapted to actuate them, mechanism connecting said crank means with the vehicle motor, instrumentalities adapted to be actuated by said crank means and mechanism to control the intake to said motor, a hollow member connecting said motor to said valve, a cylinder and piston, a hollow tube connecting said cylinder to said valve, means connecting said piston to the braking member of the vehicle, said piston being adapted to be actuated by the creation of a partial vacuum by said motor in said cylinder to thereby apply said braking member and bring the vehicle to a stop.

9. An automatic stopping device for a motor vehicle comprising a movable control wheel, a control rod connected to and adapted to be actuated by said control wheel, a valve, crank means, a member adapted to be actuated by said control rod and connected to said valve and crank means and adapted to actuate them, mechanism connecting said crank means with the vehicle motor, instrumentalities adapted to be actuated by said crank means and mechanism to control the intake to said motor, a hollow member connecting said motor to said valve, a cylinder and piston, a hollow tube connecting said cylinder to said valve, means connecting said piston to the braking member of the vehicle, said piston being adapted to be actuated by the creation of a partial vacuum by said motor in said cylinder to thereby apply said braking member and bring the vehicle to a stop, and locking means connected to said piston adapted to prevent the piston from returning to its original position after having been actuated to apply said braking member.

10. An automatic stopping device for a motor vehicle comprising a movable control wheel, a control rod connected to and adapted to be actuated by said control wheel, a valve, crank means, a member adapted to be actuated by said control rod and connected to said valve and crank means and adapted to actuate them, mechanism connecting said crank means with the vehicle motor, instrumentalities adapted to be actuated by said crank means and mechanism to control the intake to said motor, a hollow member connecting said motor to said valve, a cylinder and piston, a hollow tube connecting said cylinder to said valve, means connecting said piston to the braking member of the vehicle, said piston being adapted to be actuated by the creation of a partial vacuum by said motor in said cylinder to thereby apply said braking member and bring the vehicle to a stop, and locking means connected to said piston adapted to prevent the piston from returning to its original position after having been actuated to apply said braking member, and unlocking means adapted to be manually operated to unlock said locking means thereby permitting said piston to return to its original position.

11. An automatic retarding device for a gasoline motor vehicle comprising movable control means, valve means adapted to be actuated by said control means to open and closed positions, auxiliary idler mechanism connected to the vehicle motor and adapted to be actuated by said control means to control the intake of air-gasoline vapor to said motor, instrumentalities connected to said motor and valve means and to the braking member of the vehicle adapted to be actuated by the creation of a partial vacuum by said motor when it is idled to apply said braking member.

12. An automatic stopping device for a gasoline motor vehicle comprising movable control means, valve means adapted to be actuated by said control means to open and closed positions, idler mechansm connected to the vehicle motor and adapted to be actuated by said control means to control the intake of air-gasoline vapor to said motor, instrumentalities connected to said motor and valve means and to the braking member of the vehicle adapted to be actuated by the creation of a partial vacuum by said motor to apply said braking member, and locking means connected to said instrumentalities adapted to lock said instrumentalities in position when said braking member has been applied, and means to unlock said locking means when it is desired to release said braking member.

13. An automatic stopping device for a gasoline motor vehicle comprising a movable control wheel adjacent the steering wheel of the vehicle, a control rod connected to said control wheel, a member connected to and adapted to be actuated by said control rod, a valve, a stem for said valve adapted to slide, crank means, said valve and crank means being connected to and adapted to be actuated synchronously by said member, mechanism connecting said crank means with the vehicle motor, a butterfly valve connected to and adapted to be actuated by said mechanism whereby the flow of air gasoline vapor to the vehicle motor may be controlled, a cylinder and piston, a rod for said piston, means connecting said piston rod to the braking member of the vehicle, hollow tubing connecting said vehicle motor to said valve and to said cylinder whereby said motor may create a partial vacuum in said cylinder when said butterfly valve is closed, the creation of which vacuum serves to actuate said piston and piston rod to apply said braking member.

14. An automatic stopping device for a gasoline motor vehicle comprising a movable control wheel adjacent the steering wheel of the vehicle, a control rod connected to said control wheel, a member connected to and adapted to be actuated by said control rod, a valve, a stem for said valve adapted to slide, crank means, said valve and crank means being connected to and adapted to be actuated synchronously by said member, mechanism connecting said crank means with the vehicle motor, a butterfly valve connected to and adapted to be actuated by said mechanism whereby the flow of air gasoline vapor to the vehicle motor may be controlled, a cylinder and piston, a rod for said piston, means connecting said piston rod to the braking member of the vehicle, hollow tubing connecting said vehicle motor to said valve and to said cylinder whereby said motor may create a partial vacuum in said cylinder when said butterfly valve is closed, the creation of which partial vacuum serves to actuate said piston and piston rod to apply said braking member, and locking means adapted to prevent the return of said piston and piston rod to their original position after applying said braking member and means to unlock said locking means to thereby permit the return of said piston and piston rod to their original position.

15. An automatic retarding device for a motor vehicle having braking and clutch mechanisms and comprising control means which is maintained inoperative by the driver when the vehicle is moving normally, but which is adapted to become operative when it is no longer maintained inoperative by the driver, and means operatively connected to the aforesaid control means whereby, when the said control means becomes operative, a partial vacuum is created by the vehicle motor, and means operatively connected to said motor and to the braking and clutch mechanisms of said vehicle, said means being adapted to be set in operation by the creation of said partial vacuum to thereby apply said braking mechanism and shift the clutch.

16. An automatic idling mechanism for a gasoline motor comprising movable control means, auxiliary valve means adapted to be actuated by said control means to open position, idler mechanism connected to the motor and adapted to be actuated by said control means to control the intake of air-gasoline vapor to said motor, instrumentalities connected to said motor and valve means adapted to be actuated by the creation of a partial vacuum by said motor when it is idled.

17. A motor vehicle, controlling means therefor and a valve for regulating the flow of air-gasoline vapor to the motor, and an auxiliary valve for idling the motor, said auxiliary valve being normally open but adapted to be closed when the operator of the vehicle releases full control of the vehicle and means for so closing the said auxiliary valve, said means including connections between the controlling mechanism of the vehicle and the said valve.

18. In a retarding mechanism for motor vehicles having means for controlling the movements thereof, a valve for regulating the flow of air-gasoline vapor to the motor, and an auxiliary valve for idling the motor, connections between the said auxiliary valve and the controlling mechanism of the vehicle, in combination with means for automatically closing the said auxiliary valve when the operator of the vehicle releases complete control of the vehicle.

JOHN W. WYLLIE.